United States Patent
Liu et al.

(10) Patent No.: US 12,552,911 B2
(45) Date of Patent: Feb. 17, 2026

(54) PREPARATION OF RECYCLED POLYETHYLENE TEREPHTHALATE PELLETS, AND BOTTLES FORMED THEREFROM

(71) Applicant: Nano and Advanced Materials Institute Limited, Hong Kong (HK)

(72) Inventors: Xianqiao Liu, Hong Kong (HK); Wei Kong, Hong Kong (HK); Suqing Tan, Hong Kong (HK); Pakming Hung, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 798 days.

(21) Appl. No.: 17/964,930

(22) Filed: Oct. 13, 2022

(65) Prior Publication Data

US 2024/0141133 A1    May 2, 2024

(51) Int. Cl.
*C08J 11/26*    (2006.01)
*C08G 63/91*    (2006.01)

(52) U.S. Cl.
CPC ............. *C08J 11/26* (2013.01); *C08G 63/91* (2013.01); *C08J 2367/02* (2013.01); *C08L 2203/10* (2013.01); *Y02W 30/62* (2015.05)

(58) Field of Classification Search
CPC .......... C08G 63/91–918; C08L 2203/10; C08J 2367/02; C08J 11/26; Y02W 30/62
See application file for complete search history.

(56) References Cited

U.S. PATENT DOCUMENTS

| | | |
|---|---|---|
| 5,223,544 A | 6/1993 | Burkett et al. |
| 5,886,058 A | 3/1999 | Van Erden et al. |
| (Continued) | | |

FOREIGN PATENT DOCUMENTS

| | | |
|---|---|---|
| CN | 1032066 C | 6/1996 |
| CN | 1617904 A | 5/2005 |
| (Continued) | | |

OTHER PUBLICATIONS

Holtman, K.M. et al. Thermal Properties of Poly(ethylene terephthalate) Recovered from Municipal Solid Waste by Steam Autoclaving. J. App. Poly. Sci. vol. 126, 1698-1708. (Year: 2012).*

(Continued)

*Primary Examiner* — Christina H.W. Rosebach
(74) *Attorney, Agent, or Firm* — IDEA Intellectual Limited; Sam T. Yip

(57) ABSTRACT

A method for recycling polyethylene terephthalate, including obtaining flakes of polyethylene terephthalate which are re-polymerized using heat and/or a chain extender combined with an anti-yellowing agent to yield an average molecular weight of at least 40,000 Da and a tunable intrinsic viscosity of approximately 0.5 dl/g to 0.8 dl/g. Polyethylene terephthalate pellets are produced having a color deviation of approximately 2.5 or less from the re-polymerized 100 percent post-consumer polyethylene terephthalate flakes as raw material for formation of polyethylene terephthalate products. When compared to available rPET bottles, CIELAB color values show indiscernible color differences with the high quality rPET produced. Consequently, the high-quality rPET pellets produced are capable manufacturing PET bottles with 100% PCR content and a high number of repeated recycling cycles.

15 Claims, 1 Drawing Sheet

(56) References Cited

U.S. PATENT DOCUMENTS

| | | |
|---|---|---|
| 6,984,694 B2 | 1/2006 | Blasius, Jr. et al. |
| 7,973,092 B2 | 7/2011 | Friedlaender et al. |
| 2008/0293912 A1* | 11/2008 | Jernigan .............. C08K 5/49 528/279 |

FOREIGN PATENT DOCUMENTS

| | | |
|---|---|---|
| CN | 101258180 A | 9/2008 |
| CN | 201245583 Y | 5/2009 |
| CN | 101792523 A | 8/2010 |
| CN | 103214803 A | 7/2013 |
| CN | 103640110 A | 3/2014 |
| CN | 102642312 B | 5/2014 |
| CN | 104356612 B | 7/2016 |
| CN | 106117985 B | 6/2018 |
| CN | 109312101 B | 12/2021 |
| DE | 4034459 A1 | 5/1992 |
| DE | 19710098 A1 | 9/1998 |
| EP | 0994146 B1 | 5/2007 |
| JP | 06184291 A | 7/1994 |
| WO | 2008017843 A1 | 2/2008 |

OTHER PUBLICATIONS

Incarnato, L. et al. Structure and rheology of recycled PET modified by reactive extrusion. Polymer 41 (2000) 6825-6831. (Year: 2000).*

Yasemin Celik, et al. "Thermal and Mechanical Properties of the Recycled and Virgin PET—Part I" Polymers 2022, 14, 1326. https://doi.org/10.3390/ polym14071326.

Tobias Standau, et al., "A Review on Multifunctional Epoxy-Based Joncryl® ADR Chain Extended Thermoplastics", Polymer Reviews(2021), DOI: 10.1080/15583724.2021.1918710.

M. Villalobos, et al., "Oligomeric chain extenders for economic reprocessing and recycling of condensation plastics", Johnson Polymer, Plastic Additives Division, 8310-16th Street, Sturtevant, Wisconsin 53177-0902, USA, Energy 31 (2006) 3227-3234.

* cited by examiner

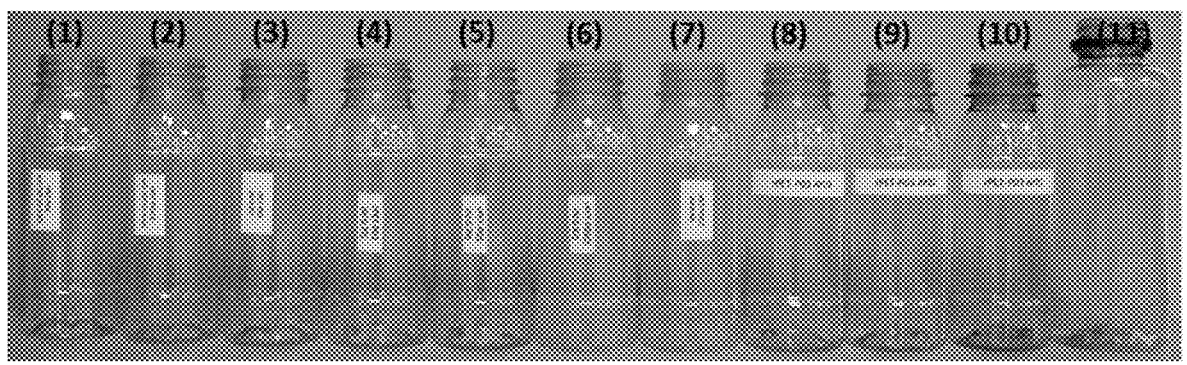

PREPARATION OF RECYCLED POLYETHYLENE TEREPHTHALATE PELLETS, AND BOTTLES FORMED THEREFROM

FIELD OF THE INVENTION

The present invention relates to recycling of polyethylene terephthalate, and, more particularly, to creating 100 percent post-consumer content polyethylene terephthalate starting materials with acceptable color, viscosity, and molecular weight suitable for polymer container blow molding processes.

BACKGROUND

Polyethylene terephthalate (PET) is a widely-used polymer for food packaging, particularly for drink bottles or other liquid food products. PET bottles are also used for holding consumer product liquids such as soap, shampoo, cleaning products, etc. Typically, PET bottles are configured for short-term use, resulting in a considerable amount of plastic waste. Although PET is susceptible to recycling, fewer than 20 percent of PET bottles are recycled. The failure to recycle the majority of PET bottles is due, in part, to the high cost of PET recycling combined with the low quality of recycled PET products.

PET recycling generally occurs in one of two ways. In the first way, mechanical recycling, recycled PET bottles are shredded and melted, followed by formation into new products. Mechanical recycling, while simple and inexpensive, results in products with reduced molecular weight, small molecule generation, and yellowing. This leads to brittleness in the recycled plastic products along with concerns related to small molecule leaching. Typically, these new products are not food contact safe so that "bottle-to-bottle" recycling is not possible with this method. In the second way, chemical recycling, PET is broken down into monomers or oligomers through, for example, glycolysis using ethylene glycol.

However, there remains a need in the art for improved polyethylene terephthalate recycling techniques that will produce high quality polyethylene terephthalate with mechanical properties suitable for bottle formation (e.g., blow molding) to enable "bottle-to-bottle recycling" at a low cost. The present invention addresses this need.

SUMMARY OF THE INVENTION

The present invention provides high-quality recycled PET (rPET) pellets from post-consumer recyclables (PCR) for producing rPET bottles capable of undergoing high number of recycling loops. In the processes for making rPET, molecular chain repairing technology, acetaldehyde (AA) clearance technology and color-improving technology combine to overcome the prior art problems with rPET.

The present invention provides 100% post-consumer rPET pellets having an average weight molecular weight of up to approximately 50,000 Da (PDI 2.00) with tunable intrinsic viscosity from 0.70 to 0.90 dl/g. AA content in both the high-quality 100% rPET pellets and related products show reduced values in comparison to commercial rPET on the market. When compared to available rPET bottles, CIELAB color values show indiscernible color differences with the high quality rPET of the present invention. Consequently, the high-quality rPET pellets produced are capable manufacturing PET bottles with 100% PCR content and a high number of repeated recycling cycles.

In one aspect, the present invention provides a method for recycling polyethylene terephthalate, including obtaining flakes of polyethylene terephthalate from 100 percent post-consumer polyethylene terephthalate products. The 100 percent post-consumer polyethylene terephthalate flakes are re-polymerized using heat and/or a chain extender combined with an anti-yellowing agent to yield an average molecular weight of at least 40,000 Da and an intrinsic viscosity of approximately 0.5 dl/g to 0.8 dl/g. Polyethylene terephthalate pellets are produced having a color deviation of approximately 2.5 or less from the re-polymerized 100 percent post-consumer polyethylene terephthalate flakes as raw material for formation of polyethylene terephthalate products.

In one aspect, the re-polymerizing includes using a chain extender selected in an amount of from 0.1% to 1%.

In one aspect, the re-polymerizing includes using a chain extender selected in an amount of from 0.3% to 0.6%.

In one aspect, the chain extender includes functional groups selected from epoxy groups, ester groups or benzene groups.

In one aspect, an acetaldehyde clearance agent is added during the re-polymerizing process.

In one aspect, the formed polyethylene terephthalate pellets are food contact grade with a transparent appearance.

In one aspect, the flakes of polyethylene terephthalate have an intrinsic viscosity from 0.5 to 0.8.

In one aspect, the re-polymerizing is performed during a twin screw extrusion process.

In one aspect, the twin screw extrusion process is performed at a temperature of between approximately 240° C. to 260° C.

In one aspect, a solid state polymerization process is performed. The solid state polymerization process includes treating the polyethylene terephthalate under a vacuum of 5 Pa to 50 Pa and a temperature from 200° C. to 245° C. for a period of time from 18 hours to 48 hours.

In one aspect, the polyethylene terephthalate pellets have polyvinyl chloride in an amount less than approximately 30 ppm, acetaldehyde in an amount less than approximately 1.0 ppm, diethylene glycol in an amount less than approximately 1.5%, and limonene in an amount less than approximately 20 ppb.

In one aspect, the formed polyethylene terephthalate pellets are a raw material for a blow molding process. The blow molding may be performed at an injection temperature from 250° C. to 300° C., a maximum draw ratio of approximately 14 to 18, and a blow molding pressure of approximately 2.0 MPa to 2.5 MPa.

The present invention provides recycled polyethylene terephthalate pellets having an average molecular weight of at least 40,000 Da, a tunable intrinsic viscosity of approximately 0.7 dl/g to 0.9 dl/g, and a color deviation of approximately 2.5 or less.

BRIEF DESCRIPTION OF THE DRAWINGS

FIG. 1 is a comparison of PET bottle colors using different processing conditions and starting materials.

DETAILED DESCRIPTION

Polyethylene terephthalate (PET) is a thermoplastic polyester that is made from a reaction between terephthalic acid and ethylene glycol, having a structure set forth below:

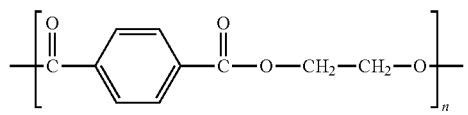

Due to its high strength, high rigidity/hardness, gas impermeability, and light weight, it is used in a number of packaging and molded products applications. As with most plastics polyethylene terephthalate is not biodegradable, making recycling critical for reducing environmental pollution.

This present invention relates to recycled polyethylene terephthalate and a process for manufacturing recycled polyethylene terephthalate pellets from post-consumer bottles. In one aspect, the process may include two sub-processes, namely extrusion pelletizing (for example, twin screw extrusion), and solid state polymerization (SSP). The present invention provides process parameters for fabricating recycled polyethylene terephthalate (rPET) pellets, including drying temperatures and times, optional addition of chain extenders, the processing parameters of extrusion, and the reaction temperature and time of SSP. The as-prepared rPET pellets exhibit excellent properties, including weight-average molecular weight up to approximately 70,000 Daltons, a polymer dispersity index of less than approximately 2.5, a tunable intrinsic viscosity from approximately 0.70 to 0.90 dl/g, a color deviation less than approximately 2.5, and a hazardous small molecules content below detection limit according to industrial standards. The properties of the rPET formed from the present invention are sufficiently high quality to use in the manufacture of food-contact bottles, such as water bottles, oil bottles, and carbonated beverage bottles. Further, the process is sufficiently low cost to be able to compete with virgin (non-recycled) PET.

In the first aspect of the present invention, post-consumer PET is sourced from a recycling facility. Typically, post-consumer products such as PET bottles are sorted and shredded and the resultant products sold as PET flakes. Details of various flake sources and flake properties are detailed in the Examples below.

In a first portion of the recycling process, the PET flakes are fed into an extrusion apparatus. Typically, a twin-screw extruder is employed although other extrusion apparatus may be used as long as they are capable of outputting PET materials such as pellets that can be used as starting materials of other polymer processes such as molding and blow molding. Along with the PET flakes, anti-yellowing agents are added. As discussed above, a common problem with recycled PET is yellowing, making the material unsuitable for "bottle-to-bottle" recycling. Examples of anti-yellowing additives include fluorescent anti-yellowness additives and optical anti-yellowness additives. Examples of particular materials and their chemical formulae are shown below:

Fluorescent Anti-Yellowness Additives:

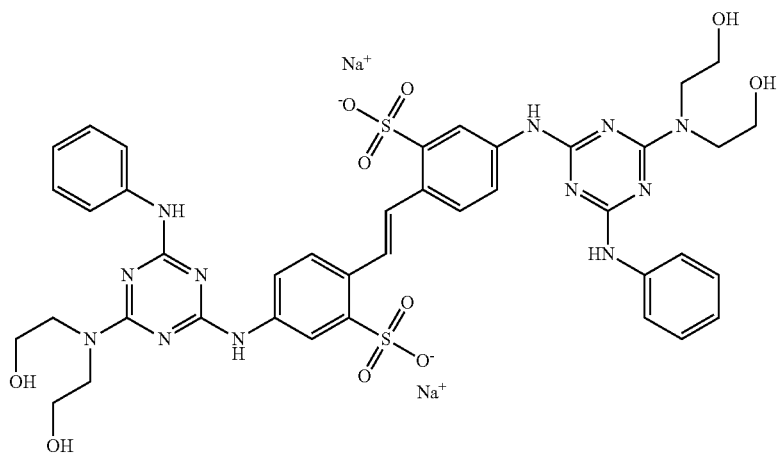

Optical Anti-Yellowness Additive

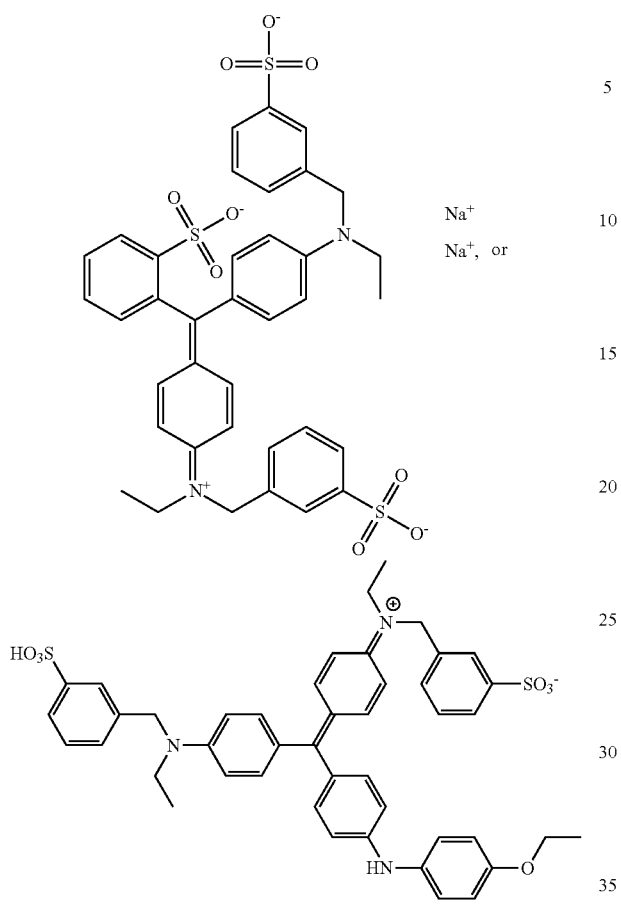

Optionally, a chain extender may be added to the starting materials in the extruder. Chain extenders are used to increase the length of the polymer chains in the PET product, thus increasing its molecular weight, since recycling degrades the polymer chains, leading to a lower molecular weight in the starting material. Functionally, chain extenders have two or more reactive sites in their molecular structure. These reactive sites can react with a terminal group of a PET polymer chain, causing bonding with an additional PET chain. The resultant increased molecular weight produces enhanced polymer properties such as greater strength and viscosity and reduced brittleness.

An exemplary structure for a chain extender is set forth below:

Styrene-Acrylic Multifunctional Chain extender With Reactive Epoxy Group:

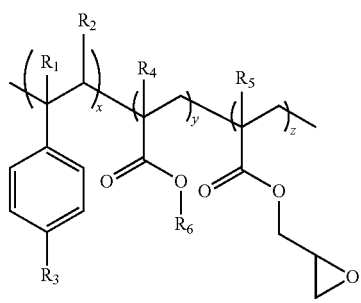

$R_1$-$R_5$ may be H, $CH_3$, a higher alkyl group or combinations thereof, $R_6$ may be an alkyl group, and x, y, and z are each between 1 and 20.

Various reactive groups can be used in chain extenders including isocyanates, epoxies, esters, benzenes, and/or anhydrides.

Isocyanate-Containing Chain Extender Structure:

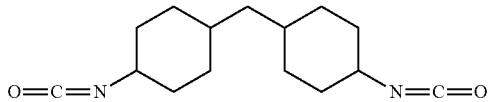 [SMILES: O=C=NC1CCC(CC2CCC(N=C=O)CC2)CC1]

Epoxy-Containing Chain Extender Structure:

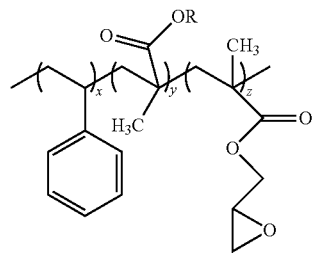

Anhydride-Containing Chain Extender Structure

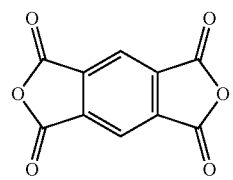 [SMILES: O=c1oc(=O)c2cc3c(=O)oc(=O)c3cc12]

Examples of specific chain extenders that may be selected for use include commercially-available chain extenders such as JONCRYL ADR4468, SILMALINK AD2238, pyromellitic dianhydride (benzene-1,2,4,5-tetracarboxylic dianhydride), or isocyanate trimer.

Various amounts of chain extenders may be selected in order to tune the viscosity to a desired value. For example, blow molding processes may require a starting material with a higher intrinsic viscosity while molding via extrusion does not require as high of an intrinsic viscosity and thus lower amounts of chain extenders or no chain extender may be used. When a chain extender is used, the amount ranges from 0.1 wt. % to 1 wt. % with 0.1% for lower viscosity pellets to 1% for higher viscosity pellets. More particularly, the range for the chain extender may be from 0.3 wt. % to 0.6 wt. %.

Further additives may be provided with the starting material PET flakes, anti-yellowing agent, and optional chain extender, such as an acetaldehyde clearance agent.

In an embodiment, twin screw extrusion (TSE) may be used. Various parameters may be used depending upon the selected apparatus, the properties of the starting material, and the desired properties of the PET pellets to be produced. In one aspect, a twin screw extrusion process may be used in which diameter of the screw ranges from 25 mm to 40 mm, with 35 mm being a particular example. The L/D ratio of the screws ranges from 30/1 to 50/1, with 36/1 being a particular example. The number of kneading blocks may range from 1 to 5, with 2 to 3 being a particular example. The screw speed may range from 200 rpm to 500 rpm, with 300 rpm being a particular example. The twin screw extrusion process may be performed at a temperature of between approximately 240° C. to 260° C.

Prior to extrusion, a drying process is optionally performed. The presence of water during extrusion may damage the PET, resulting in a lower molecular weight. Therefore, drying at a temperature of approximately 70° C. to 140° C. at atmospheric pressure or under vacuum for a period of time from 6 hours to approximately 24 hours may be performed.

Following extrusion, a solid state polymerization process may be performed The solid state polymerization may be performed by treating the polyethylene terephthalate under a vacuum of 5 Pa to 50 Pa, a rotation speed of 1 rpm to 10 rpm and a temperature from 200° C. to 245° C. for a period of time from 18 hours to 48 hours. Exemplary parameters include a vacuum of 10 Pa to 20 Pa rotation speed of 5 rpm, temperature of 215° to 235° C. and reaction time of 24 h to 36 h.

The formed polyethylene terephthalate from 100 percent post-consumer polyethylene terephthalate products has an average molecular weight of at least 40,000 Da (with approximately 50,000-70,000 Da being achievable) and a tunable intrinsic viscosity of approximately 0.7 to 0.9 (with approximately 0.75 dl/g to 0.85 dl/g being an exemplary range). The polyethylene terephthalate pellets have a color deviation of approximately 2.5 or less (in particular, from 0.09 to 2.5).

The recycled polyethylene terephthalate pellets have a very low level of contamination such that they may optionally be used for food contact applications. In one embodiment, the polyethylene terephthalate pellets have polyvinyl chloride in an amount less than approximately 30 ppm, acetaldehyde in an amount less than approximately 1.0 ppm, diethylene glycol in an amount less than approximately 1.5%, and limonene in an amount less than approximately 20 ppb.

The formed recycled polyethylene terephthalate pellets may be used as starting materials in a variety of polymer processes, including injection blow molding using 100 percent recycled starting materials. Exemplary injection blow molding fabrication conditions include an injection temperature from 250° C. to 300° C., a maximum draw ratio of approximately 14 to 18, and a blow molding pressure of approximately 2.0 MPa to 2.5 MPa.

Further aspects of the present invention are demonstrated in the following examples.

Examples

1. Screening of Post-Consumer Content Starting Materials:

To achieve bottle-to-bottle recycling, "flake-to-pellet" technology is developed by using commercial rPET flakes. A total of three types rPET flakes were purchased from different suppliers and evaluated. The intrinsic viscosity (IV) value of rPET flakes were measured according to ASTM D4603 and D446 industrial standard by using Ubbelohde viscometer, specially measuring the time for the PET solution to pass through two calibrated marks in the glass capillary viscometer. The IV value is important factor to determine the processability and mechanical property of rPET. The rPET flakes (rPET-F01, rPET-F02, rPET-F03) were made into pellets by using twin-screw extruder at a processing temperature up to 270° C., which is above rPET flake melting temperature (i.e., 250-260° C.), to observe if any obvious discoloration or yellowness on the as-prepared rPET pellets. Results are summarized in Table 1. In particular, extrusion at a temperature of 245-250° C. is performed.

TABLE 1

Screening results of rPET flakes from different suppliers

| SAMPLE ID | PET Flake Supplier | Grade | Initial Intrinsic Viscosity-IV (dl/g) | Appearance |
|---|---|---|---|---|
| rPET-F01 | Guangzhou Tonghe Plastic Products Co., Ltd. | Pure white | 0.645 | High yellowness, low initial IV value |
| rPET-F02 | Beijing Incom Resources Recovery Recycling Co., Ltd. | Blue white | 0.782 | Grey after pelletizing |
| rPET-F03 | Dongguan Tok Zin Industrial Co., Ltd. | 3A | 0.755 | Good appearance after pelletizing |

The results showed that the flake sample (#rPET-F03) has both good initial IV value (0.755) and less yellowness after forming into pellets through high temperature (245-250° C.) twin-screw extrusion process. Therefore, the rPET-P03 sample was selected as a starting material.

However, the IV value was found decrease substantially due to the reduction in molecular weight by hydrolysis in the presence of moisture during the high temperature (270° C.) pelletizing process. As measured, the IV value of rPET-P03 pellets was 0.51 dl/g, which is much lower than carbonated bottle grade PET (IV>0.7 dl/g), and this also resulted in an undesirable loss of mechanical properties. To improve the IV value, the as-prepared rPET-P03 pellet was further treated by solid-state polymerization (SSP).

Drying Conditions for Twin Screw Extruder

| Sample No. | name | Drying conditions | ΔH (J/g) (ave) | Tm (° C.) (ave) | Tg (° C.) (ave) | Moisture (ppm) |
|---|---|---|---|---|---|---|
| 1 | rPET flakes (TZ) | no | 35.5 ( ±4.9) | 252 ( ±3.5) | 84 ( ±0.7) | 6,000 |
| 2 | Dried rPET flakes-1 | Hot air, 140° C., 6 h | 36 ( ±0.0) | 254 ( ±0.7) | 76 ( ±4.9) | <50 |
| 3 | Dried rPET flakes-2 | Vacuum, 70° C., 24 h | 37.5 ( ±0.7) | 258 ( ±0.7) | 78 ( ±2.1) | 75 |
| 4 | Dried rPET flakes-3 | Vacuum, 80° C., 24 h | 33.5( ±2.1) | 250 ( ±2.1) | 84( ±0.7) | 35 |

The solid-state polymerization combined with the reaction to re-connect the polymer chain at high temperature between Tg (80-85° C.) and Tm (250° C.) so as to increase the IV value. Vacuum has also been employed to eliminate small molecular weight impurities, meanwhile to protect discoloration or yellowness. The SSP trial was conducted at 235° C. at a vacuum of 40 Pa for 36 hours.

The as-developed rPET pellet was made into a standard color plate (ø 100 mm, 2.4 mm thick) at temperature of 270° C., and the yellowness b value was measured according to GB/T 7921 with Hunter lab colorimeter. The results showed a b value of 0.87 dl/g, which met the target of less than 6.0 and the IV value of rPET pellet after SSP was measured as 0.76 dl/g as shown in Table 2.

TABLE 2

Color and IV measurement of rPET pellet after re-polymerization

| Sample No. | Before repolymerization IV (dl/g) | After repolymerization IV (dl/g) | rPET color plate by injection moldiing L*a*b* |
|---|---|---|---|
| rPET-P03 | 0.51 | 0.76 | 19.60 − 1.25 + 0.87 |

The molecular weight of as-prepared rPET pellet was characterized before and after re-polymerization by an external laboratory. The results are shown in Table 3. It is found that the re-polymerization process led to an increase in molecular weight from approximately 38,269 Da to 50,066 Da, yet maintained narrow molecular weight distribution as measured by the polydispersity index of 1.994 and 2.004, respectively, In general, a polydispersity index of less than approximately 2.5 is acceptable.

TABLE 3

Molecular weight test for as-prepared rPET pellet before and after SSP

| rPET-P03 pellet | Before SSP | After SSP |
|---|---|---|
| Average Mw | 38269 | 50066 |
| Polydispersity | 1.994 | 2.004 |

The content of small molecule contaminants of as-prepared rPET pellets were measured including acetaldehyde, diethylene glycol and limonene. These regulatory testing items are essential for food contact compliance for drink bottle applications. The test results are summarized in Table 4.

TABLE 4

The regulatory compliance test results of as-prepared rPET pellet.

| No. | Small molecules | Methods | Standards | Results |
|---|---|---|---|---|
| 1 | Acetaldehyde | GC | <1.0 ppm | Not detected |
| 2 | Diethylene glycol | GC | <1.5% | Not detected |
| 3 | Limonene | GC | <20 ppb | Not detected |

FIG. 1 depicts the results of blow molding using various recycled PET starting materials while Table 5 shows the ingredients, their percentages, viscosity, solid state polymerization, drying conditions, and injection molding conditions. For comparison, a commercially available recycled STARBUCKS PET bottle is depicted.

TABLE 4

| | CE | AY | SSP | IV | Drying | Injection molding |
|---|---|---|---|---|---|---|
| 1 | 0% | 0% | w/o | 0.57 | 140° C. | 270° C. |
| 2 | 0.3% | 0% | w/o | 0.62 | 140° C. | 270° C. |
| 3 | 0% | 0% | w | 0.75 | 160° C. | 280° C. |
| 4 | 0% | 0% | w | 0.75 | 140° C. | 270° C. |
| 5 | 0% | 0% | w | 0.79 | 140° C. | 270° C. |
| 6 | 0% | 0% | w | 0.82 | 140° C. | 270° C. |
| 7 | 0.3% | 0% | w | 0.90 | 140° C. | 270° C. |
| 8 | 0% | 0.00250% | w | 0.75 | 140° C. | 270° C. |
| 9 | 0% | 0.00375% | w | 0.75 | 140° C. | 270° C. |

TABLE 4-continued

| | CE | AY | SSP | IV | Drying | Injection molding |
|---|---|---|---|---|---|---|
| 10 | 0% | 0.00500% | w | 0.75 | 140° C. | 270° C. |
| 11 | | | STARBUCKS rPET bottle | | | |

As seen from FIG. 1, the fabricated bottles 8-10 that include the anti-yellowing agent show the clearest color, similar to that of virgin PET.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

As used herein and not otherwise defined, the terms "substantially," "substantial," "approximately" and "about" are used to describe and account for small variations. When used in conjunction with an event or circumstance, the terms can encompass instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

The invention claimed is:

1. A method for recycling polyethylene terephthalate, comprising:
   obtaining flakes of polyethylene terephthalate from 100 percent post-consumer polyethylene terephthalate products;
   re-polymerizing the 100 percent post-consumer polyethylene terephthalate flakes using heat and/or a chain extender combined with an anti-yellowing agent yielding an average molecular weight of at least 40,000 Da and a tunable intrinsic viscosity of approximately 0.7 dl/g to 0.9 dl/g;
   creating recycled polyethylene terephthalate pellets from re-polymerized polyethylene terephthalate having a color deviation of approximately 2.5 or less for formation of polyethylene terephthalate products from the pellets.

2. The method for recycling polyethylene terephthalate according to claim 1, wherein the re-polymerizing includes using a chain extender selected in an amount of from 0.1 wt. % to 1% wt. %.

3. The method for recycling polyethylene terephthalate according to claim 1, wherein the re-polymerizing includes using a chain extender selected in an amount of from 0.3 wt. % to 0.6 wt. %.

4. The method for recycling polyethylene terephthalate according to claim 2, wherein the chain extender includes multiple functional groups the group consisting of epoxy groups, ester groups, benzene groups, isocyanate groups, anhydride groups, oxazoline groups, and glycols.

5. The method for recycling polyethylene terephthalate according to claim 1, wherein an acetaldehyde clearance agent is added during the re-polymerizing process.

6. The method for recycling polyethylene terephthalate according to claim 1, wherein the formed polyethylene terephthalate pellets are food contact grade with a transparent appearance.

7. The method for recycling polyethylene terephthalate according to claim 1, wherein the flakes of polyethylene terephthalate have an intrinsic viscosity from 0.5 to 0.8 dl/g.

8. The method for recycling polyethylene terephthalate according to claim 1, wherein the re-polymerizing is performed during a twin screw extrusion process.

9. The method for recycling polyethylene terephthalate according to claim 8, wherein the twin screw extrusion process is performed at a temperature of between approximately 240° C. to 260° C.

10. The method for recycling polyethylene terephthalate according to claim 1, wherein the method further comprises solid state polymerization.

11. The method for recycling polyethylene terephthalate according to claim 10, wherein the solid state polymerization comprises treating the polyethylene terephthalate under a vacuum of 5 Pa to 50 Pa and a temperature from 200° C. to 245° C. for a period of time from 18 hours to 48 hours.

12. The method for recycling polyethylene terephthalate according to claim 1, further comprising drying at an elevated temperature prior to creating the recycled polyethylene terephthalate pellets.

13. The method for recycling polyethylene terephthalate according to claim 1, wherein the polyethylene terephthalate pellets have polyvinyl chloride in an amount less than approximately 30 ppm, acetaldehyde in an amount less than approximately 1.0 ppm, diethylene glycol in an amount less than approximately 1.5%, and limonene in an amount less than approximately 20 ppb.

14. The method for recycling polyethylene terephthalate according to claim 1, further comprising blow molding with the formed polyethylene terephthalate pellets as raw material.

15. The method for recycling polyethylene terephthalate according to claim 14, wherein the blow molding is performed at an injection temperature from 250° C. to 300° C., a maximum draw ratio of approximately 14 to 18, and a blow molding pressure of approximately 2.0 MPa to 2.5 MPa.

* * * * *